Figure 1:
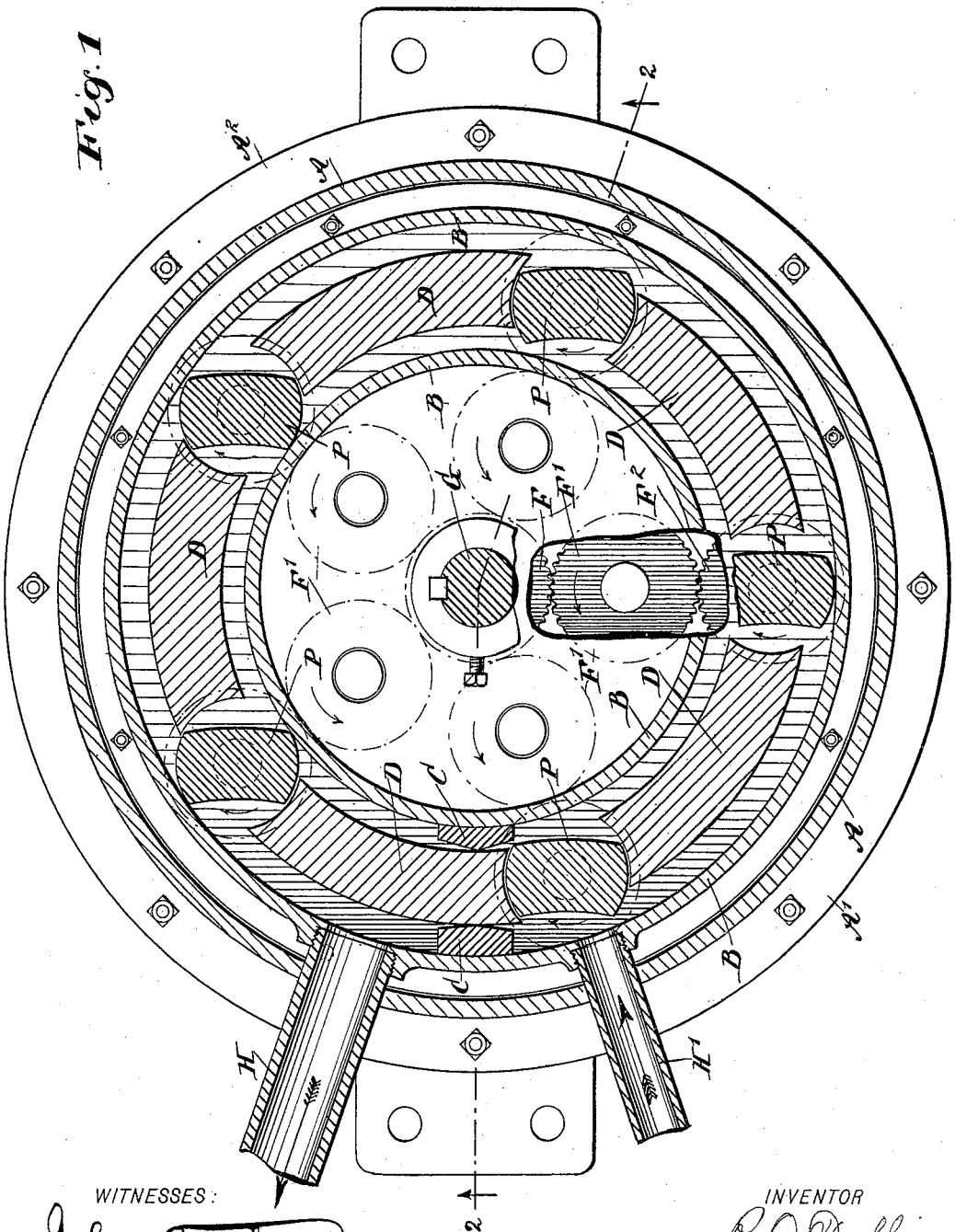

No. 619,730. Patented Feb. 21, 1899.
R. O. DOBBIN.
ROTARY ENGINE.
(Application filed Mar. 28, 1898.)
(No Model.) 2 Sheets—Sheet 1.

WITNESSES: INVENTOR
R. O. Dobbin
BY
ATTORNEYS.

No. 619,730. Patented Feb. 21, 1899.
R. O. DOBBIN.
ROTARY ENGINE.
(Application filed Mar. 28, 1898.)
(No Model.) 2 Sheets—Sheet 2.
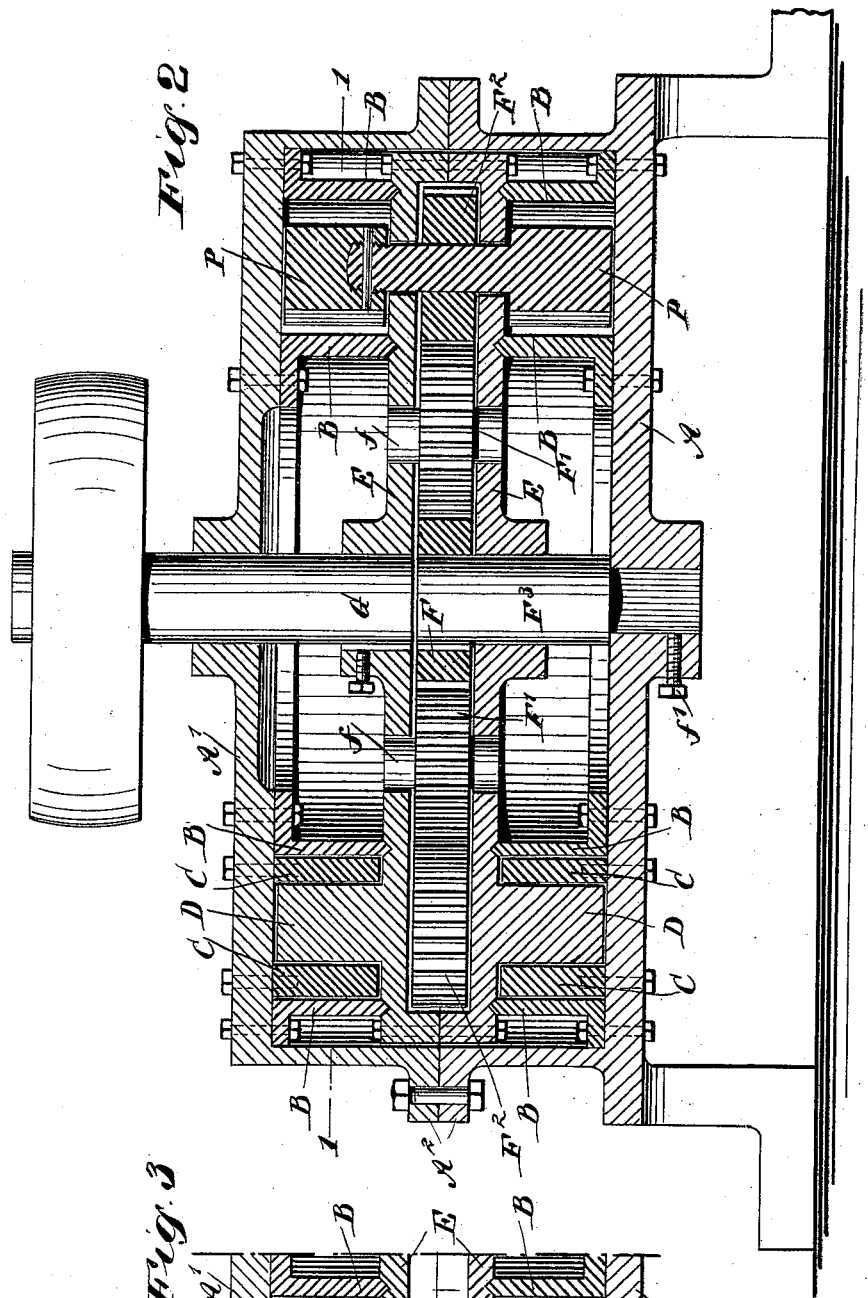
WITNESSES:
INVENTOR
R. O. Dobbin
BY
ATTORNEYS.
THE NORRIS PETERS CO., PHOTO-LITHO., WASHINGTON, D. C.

UNITED STATES PATENT OFFICE.

ROBERT O. DOBBIN, OF WATERLOO, CANADA, ASSIGNOR TO HIMSELF AND THE WATERLOO MANUFACTURING COMPANY, OF SAME PLACE.

ROTARY ENGINE.

SPECIFICATION forming part of Letters Patent No. 619,730, dated February 21, 1899.

Application filed March 28, 1898. Serial No. 675,436. (No model.)

*To all whom it may concern:*

Be it known that I, ROBERT O. DOBBIN, of Waterloo, in the county of Waterloo, Province of Ontario, and Dominion of Canada, have invented a new and Improved Rotary Engine, of which the following is a full, clear, and exact description.

My invention relates to an improvement in rotary engines, comprising an annular cylinder-chamber having a rotating disk forming one side of the same, the cylinder having fixed abutments projecting inwardly from opposite walls, but reaching only part way to the center, the rotating disk having a flange formed in segments and of a width to fit between the abutments, and said disk also having rotary piston-heads formed as short segments similar in thickness to the flange and rotatable upon their axes in such a manner that they extend at all times in the same direction.

The invention consists of certain novel features of construction which will be hereinafter described, and particularly pointed out in the claims.

Reference is to be had to the accompanying drawings, forming a part of this specification, in which similar characters of reference indicate corresponding parts in all the figures.

Figure 1 is a section upon the line 1 1 of Fig. 2. Fig. 2 is a section upon the line 2 2 of Fig. 1, and Fig. 3 is a section through one side of the cylinder-chamber between the pistons.

In the drawings the engine is shown as consisting of two cylinders located side by side and having the revolving disk between them. It is evident that a single cylinder may be used instead of the double construction herein shown. The cylinder is formed by the plates A A', which are provided upon their periphery with flanges extending to one side and within which the cylinder proper is formed.

In the double construction shown in the drawings the plates A A', forming the two opposite cylinders, are united by bolts passing through the flanges $A^2$. The cylinder-chamber proper is formed by the two rings B B, which are bolted to the plates A A' and form the inner and outer walls of the cylinder-chamber. The plates A and A' form one side wall of the cylinder-chamber, and the rotating disks E, which carry the pistons, form the other side wall. A tight joint is secured between the edges of the rings B B and the rotating disks E by giving the edges of the rings B an angular shape and inserting them in corresponding grooves formed in the disks E.

Upon one side of the cylinder-chamber are placed the abutments C C, which are fixed to the inner and outer rings B B, but project only a part of the way to the center. The disks E, which rotate and carry the pistons, are provided with flanges D, consisting of a number of segments. This flange is made of a thickness such that it entirely fills the space between the abutments C C. As shown in the drawings, this flange is composed of five segments, and an equal number of pistons P are mounted between these segments. The pistons are formed as short sections equal in thickness to the thickness of the flanges D and having their edges rounded, so as to form a tight joint with the ends of the flange-sections. The ends of these sections of the flanges are correspondingly rounded, so that there will be a tight joint between the pistons and the flanges.

The pistons P are mounted upon journals or shafts, so that they may rotate upon their axes. Between the two disks E, carrying the pistons, are mounted gear-wheels $F^2$, which are fixed upon the shafts of the pistons. Between the said disks and mounted thereon are gear-wheels F', which are idlers connecting the gear-wheels $F^2$ with the gear-wheel F, which is mounted concentric with the cylinder and so that it cannot rotate. This gear-wheel F is fixed to a short shaft $F^3$, which extends through one of the disks E and is secured in the plate A. It is shown as secured in the plate by means of a set-screw *f*. It will thus be seen that when the disks E are revolved upon the engine-shaft G, to which they are attached, the pistons P, which are mounted upon the shaft of the gear-wheels $F^2$, will be rotated in such a manner as to give their shafts one revolution for each revolution of the disks and in such a direction that the pistons will extend in the same direction at all times. In consequence of this the pistons at the point where they pass the abutments C C will occupy the same space as the segments of the flanges D, and will thus maintain a constant closure at the abutments. After passing the abutments the rotation of the pistons will continue until they occupy the position shown by the lower one in Fig. 1, in which position they extend squarely across the cylinder-chamber and are acted upon by the steam to rotate the engine. They will begin to close the cylinder-chamber before they reach this point, as is shown by the two upper ones in Fig. 1.

The circular surface of the cylinder extends over a little more than one-fifth of the circumference on each side. In consequence of this the pistons will maintain contact with the surfaces of the rings B B while passing through a little more than one-fifth of the circumference. There will therefore be at least one of these pistons in contact with these rings through the lower half of the movement of the pistons.

The pipe H', which is connected with the outer ring B, is the pipe designed for admission of the steam. The steam entering the cylinder-chamber presses against the abutments C and the piston P, which is at that side of the cylinder represented in Fig. 1 as at the bottom of the drawings. The effective area will therefore be the difference between the cross-sections of the cylinder-chamber and the flanges D. The exhaust-steam may be taken out at a point nearly opposite the pipe H' or, as shown in the drawings, through the pipe H, located close on the opposite side of the abutments C.

It is essential to the proper operation of this engine that the pistons P should have their side surfaces curved and form sections of circles of the same radius as the radius of the contact-surface of the abutments C. By forming them in this manner they will pass smoothly between the abutments C and keep the space between the abutments entirely filled.

Having thus fully described my invention, I claim as new and desire to secure by Letters Patent—

1. A rotary engine, having an annular cylinder-chamber, fixed abutments upon opposite walls thereof at one side and projecting partially across said chamber, a rotating disk forming one side wall of the cylinder and having a circular flange projecting centrally into and across the cylinder and divided into segments, pistons journaled upon said disk between said segments, said piston and flange being of the same thickness as the distance between the abutments, and the pistons being of a width equal to the width of the cylinder-chamber and the space between the flange-segments, and means for giving the pistons rotation relative to the disk and so that rotation relative to a fixed member is prevented, substantially as described.

2. A rotary engine having an annular cylinder-chamber, fixed abutments extending from opposite walls thereof, a piston-disk having a segmental flange, filling the space between said walls, piston-heads journaled upon said disk, forming a part of said flange and connecting its segments, and means for rotating said piston-heads so that they extend at all times in the same direction, substantially as described.

3. A rotary engine having an annular cylinder-chamber, fixed abutments upon opposite walls thereof at one side and projecting partially across said chamber, a rotating disk forming one side wall of the cylinder-chamber and having a circular flange projecting centrally into and across the cylinder and divided into segments, pistons journaled upon said disk between said segments, said pistons and flange being of the same thickness as the distance between abutments and the pistons being of a width equal to the width of a cylinder-opening and the space between the flange-segments, gears upon the piston-head journals, a gear fixed concentric with the engine-shaft, and idler-gears connecting the piston-gears with the central gear, substantially as described.

4. A rotary engine having an annular cylinder-chamber, abutments extending from opposite walls thereof toward but short of the center, a rotating disk forming one side wall of the chamber, piston-heads mounted upon said disk, means for giving them rotation thereon, whereby they are passed edgewise between said abutments, and a sectional flange upon said disk between the pistons and closing the space between the abutments, substantially as described.

ROBERT O. DOBBIN.

Witnesses:
ALEXANDER MILLAR,
KATE MILLAR.